(12) United States Patent
Beutl et al.

(10) Patent No.: US 8,851,806 B2
(45) Date of Patent: Oct. 7, 2014

(54) APPARATUS FOR THE CONVEYING OF PLASTICS MATERIAL PREFORMS

(71) Applicant: Krones AG, Regensburg (DE)

(72) Inventors: Jürgen Beutl, Sinzing (DE); Andreas Seidl, Donaustauf (DE); Florian Geltinger, Donaustauf (DE); Carsten Schröter, Kodersdorf (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/691,879

(22) Filed: Dec. 3, 2012

(65) Prior Publication Data
US 2013/0156512 A1 Jun. 20, 2013

(30) Foreign Application Priority Data

Dec. 14, 2011 (DE) .......................... 10 2011 056 441

(51) Int. Cl.
  *B65G 53/16* (2006.01)
  *B65G 51/03* (2006.01)
  *B65G 21/20* (2006.01)
(52) U.S. Cl.
  CPC ...... *B65G 51/035* (2013.01); *B65G 2201/0247* (2013.01); *B65G 21/2072* (2013.01)
  USPC .............................. 406/86; 406/88; 198/836.3
(58) Field of Classification Search
  USPC .................................... 406/86, 88; 198/836.3
  See application file for complete search history.

(56) References Cited

U.S. PATENT DOCUMENTS

| | | | | |
|---|---|---|---|---|
| 5,161,919 A * | 11/1992 | Smith et al. | ...................... | 406/86 |
| 5,246,314 A | 9/1993 | Smith et al. | | |
| 6,059,096 A * | 5/2000 | Gladieux | ................... | 198/836.3 |
| 6,190,094 B1 * | 2/2001 | Rediess et al. | ................... | 406/19 |
| 6,368,027 B1 * | 4/2002 | Trenel et al. | ..................... | 406/87 |
| 6,488,449 B1 * | 12/2002 | Laquay et al. | ................... | 406/88 |
| 6,685,401 B1 * | 2/2004 | de Almeida Rodrigues et al. | ............................... | 406/11 |
| 6,889,823 B2 * | 5/2005 | Delaporte et al. | ......... | 198/836.3 |
| 7,520,380 B2 * | 4/2009 | Ranger | ....................... | 198/861.1 |
| 2004/0115012 A1 | 6/2004 | Seidl et al. | | |

FOREIGN PATENT DOCUMENTS

DE  20308513 U1  7/2004
DE  69819214 T2  8/2004

(Continued)

OTHER PUBLICATIONS

German Search Report mailed Jul. 17, 2012 in German Application No. 102011056441.1 (English Translation provided).

*Primary Examiner* — William R Harp
(74) *Attorney, Agent, or Firm* — Oppedahl Patent Law Firm LLC (57) ABSTRACT

An apparatus (1) for the conveying of plastics material pre-forms (10) along a pre-set conveying path (P) with a first guide rail (2) and a second guide rail (4) for guiding the plastics material pre-forms (10), wherein the plastics material pre-forms (10) are guided between the guide rails (2, 4) and the guide rails (2, 4) have in each case first support faces (12, 14) which extend along the conveying path (P) and which support the plastics material pre-forms (10) during the conveying thereof. The apparatus (1) has a stressing device (42, 44) for acting upon the plastics material pre-forms (10) with a gaseous medium. The plastics material pre-forms are conveyed along their conveying path by being acted upon with the gaseous medium, and a geometrical position of the guide rails is capable of being altered with respect to each other.

11 Claims, 6 Drawing Sheets

(56) References Cited

FOREIGN PATENT DOCUMENTS

| DE | 102009016593 | A1 | 10/2010 |
|----|--------------|----|---------|
| EP | 1106545 | A1 | 6/2001 |
| EP | 1409385 | B1 | 4/2004 |
| WO | 2004096680 | A1 | 11/2004 |
| WO | 2008083815 | A1 | 7/2008 |

* cited by examiner

APPARATUS FOR THE CONVEYING OF PLASTICS MATERIAL PREFORMS

The present invention relates to an apparatus for the conveying of plastics material pre-forms. Apparatus of this type are known from the prior art and supply plastics material pre-forms for example to a heating unit which heats these plastics material pre-forms. In this case, widely differing conveying devices are known, such as for example roller-type sorters, which have two opposed rollers, between which the plastics material pre-forms are conveyed. In addition, conveying devices are also known which convey the plastics material pre-forms on the basis of gravity in such a way that the plastics material pre-forms rest on two rails arranged laterally and slide on the latter.

An air transport system is known from WO 2008/083815 A1. In this case this air transport system is used for conveying plastic bottles.

It has nevertheless previously been assumed that such a principle is not capable of being applied in a similar manner to the conveying of plastics material pre-forms, since in the case of plastic bottles the centre of gravity thereof is situated at a substantially lower level than in the case of plastics material pre-forms and therefore, in particular in the case of rapid conveying, tilting cannot be carried out as easily as in the case of plastics material pre-forms.

An apparatus for supplying pre-forms to a blow moulding machine is known from DE 203 08 513 U1. In this case a sliding conveying means is provided which has two rails which support the plastics material pre-forms below their carrying rings. A corresponding roller-type sorter is installed close to the floor, in which case a vertical conveyor which lifts the pre-forms is interposed between the roller-type sorter and the end of the aforesaid slide for the pre-forms.

In addition, EP 1 409 385 B1 describes an air conveyor. In this case this air conveyor is likewise used for conveying already shaped plastic bottles. The subject matter of this publication is hereby also made the subject matter of the present application by reference in its entirety.

Furthermore, the problem frequently arises in the case of plastics material pre-forms that the latter can have the most widely differing designs and differ in particular in the design of their carrying ring and/or retaining ring and/or the thread. It would thus be desirable to provide a conveying device which is capable of being adapted to various geometries of pre-forms without undue outlay.

In addition, a rapid conveying of the plastics material pre-forms should also be made possible. These objects are attained by an apparatus according and a guide rail according to the independent claims. Advantageous embodiments and further developments form the subject matter of the sub-claims.

An apparatus according to the invention for the conveying of plastics material pre-forms along a pre-set conveying path has a first guide rail for guiding the plastics material pre-forms and a second rail for guiding the plastics material pre-forms. In this case the plastics material pre-forms are capable of being guided between the guide rails and the guide rails have in each case first support faces which extend along the conveying path and which support the plastics material pre-forms during the conveying thereof.

According to the invention the apparatus has a stressing device for acting upon the plastics material pre-forms with a gaseous medium, which stressing device is designed in such a way that the plastics material pre-forms are conveyed along their conveying path by being acted upon with the gaseous medium. In addition, a geometrical position of the guide rails is capable of being altered with respect to each other, in particular in order to achieve an adaptation to different types of plastics material pre-forms.

It is therefore proposed that the plastics material pre-forms should be conveyed by being acted upon with the gaseous medium and, in particular, by being acted upon with air. In this case the two guide rails are, in particular, made at least locally and preferably completely straight. In addition, the force of gravity can also be utilized for conveying the plastics material pre-forms.

Furthermore, the conveying device is advantageously arranged between a first treatment unit for the plastics material pre-forms and a second treatment unit for the plastics material pre-forms. In this way, for example, a sorter can first be provided which sorts the plastics material pre-forms, and a so-called clock-time wheel which supplies the plastics material pre-forms for example to a heating device can be attached to the apparatus described here for the conveying of the plastics material pre-forms.

In particular, the guide rails support a carrying ring of the plastics material pre-forms during the conveying. A support by way of the so-called retaining ring of the plastics material pre-forms, however, would also be possible.

A higher mechanical performance can be made possible by the procedure according to the invention. In addition, as compared with the prior art it is possible to prevent breakdowns in the flow of pre-forms in the pre-form supply rail from occurring relatively frequently, in particular in the case of light pre-forms. Breakdowns of this type can also result in a complete stoppage of the plant. In addition, the apparatus according to the invention allows improved accessibility during the maintenance and changing the types of plastics material pre-forms.

In the case of an advantageous embodiment at least one guide rail for changing the geometrical position is pivotable about a pivot axis which extends parallel to the conveying path of the plastics material pre-forms. In this way, the guide rail can have for example a plurality of the aforesaid support faces which co-operate with the plastics material pre-forms depending upon the pivoting position. As well as or in addition to this, it is also possible, however, for at least one guide rail to be movable in the position thereof transversely to the conveying path or the conveying direction respectively of the containers, in order to alter a distance between the two guide rails with respect to each other in their entirety in this way. It is advantageous for the two guide rails to be pivotable in each case about pre-set pivot axes, these axes being particularly preferably parallel to each other and particularly preferably also at the same height. In the case of a further advantageous embodiment the apparatus has lateral guiding elements for the lateral guidance of the plastics material pre-forms. These lateral guiding elements are used in particular in this case for supporting or guiding a main body of the plastics material pre-forms which is situated below the carrying ring. In this case it is also advantageous for these lateral guiding elements to be capable of being altered in a position with respect to each other. In this way, an adaptation to different diameters of the pre-forms can be carried out.

It is advantageous for the lateral guiding elements therefore to be arranged below the guide rails. It would also be possible, however, for only one lateral guiding element of this type to be provided.

In the case of a further advantageous embodiment the stressing device has a first air conveying duct which is arranged above the guide rails and which acts upon the apertures of the plastics material pre-forms with the gaseous medium in order to convey them. In this case this air conveying duct can have a plurality of openings which are designed in such a way that the air strikes the plastics material pre-forms obliquely and drives them forwards. In addition, it is possible for this air conveying duct to be acted upon with compressed air from two sides or from two supply lines which are opposite each other. In this case each of these supply means can be associated in each case with one guide rail.

In the case of a further advantageous embodiment the apparatus has a holding down element which is provided for holding down the plastics material pre-forms. In this case this can be for example a centrally arranged holding down element which is arranged between the two guide rails and which prevents the plastics material pre-forms from escaping upwards. It is thus advantageous for this holding down element to be arranged above the conveying path of the plastics material pre-forms. In this case this holding down element can preferably extend along the conveying path of the plastics material pre-forms. Instead of the aforesaid holding down element, it would also be possible, however, for the guide rails themselves to have a holding down element of this type, for example by the support face for the plastics material pre-forms being designed in the form of a wall of a groove and by the holding down element extending over it in the form of a further boundary face of the groove. This is explained in greater detail with reference to the figures.

In the case of a further advantageous embodiment a position of the holding down element with respect to the guide rails is also capable of being altered in a longitudinal direction of the plastics material containers.

It would also be possible, however, for the two guide rails to have in each case a plurality of grooves of this type which are thus capable of being adapted to various designs of plastics material pre-forms.

In the case of a further advantageous embodiment at least one guide rail has a second support face which extends along the conveying path of the plastics material pre-forms, namely in such a way that the plastics material pre-forms are capable of being optionally supported by means of the first support face or the second support face during their conveying. As a result of the choice of the respective support faces an adaptation to different plastics material pre-forms can thus be made. In this case it is advantageous for an adaptation to the different support faces to be carried out by a pivoting movement of the guide rails.

The present invention further relates to a guide rail for the conveying of plastics material pre-forms, the guide rail extending along a pre-set longitudinal direction and the guide rail having a first support face which likewise extends along the pre-set longitudinal direction and by means of which the plastics material pre-form is capable of being supported during the conveying thereof.

According to the invention the guide rail has a second support face which extends along the pre-set longitudinal direction and by means of which the plastics material pre-form is capable of being supported during the conveying thereof, and the two support faces are formed on the guide rail in such a way that the plastics material pre-form is capable of being optionally supported by the first support face or the second support face during its conveying. In this way, as mentioned above, an adaptation to different geometries of the plastics material pre-form can be achieved by the choice of the support face.

In the case of a further advantageous embodiment the guide rail has an adapter element capable of being removed from the guide rail, this adapter element extending in a state arranged on the guide rail along the pre-set longitudinal direction and this adapter element forming a third support face, by means of which the plastics material pre-form is capable of being supported. In this case it is additionally possible for a further portion of this adapter element also to form at the same time a lateral guiding device for the plastics material pre-form. It is particularly preferred for this to be an adapter element which can be arranged without a tool on the guide rail or can also be removed from the latter. In this way, for example, the adapter element can be a clip-on element which in an assembled state is connected in a positively locking and/or non-positively locking manner to the guide rail. It is advantageous for the adapter element to be an element of plastics material.

In the case of a further advantageous embodiment at least one support face is also a face bounding a guide groove for guiding the plastics material pre-forms. As mentioned above, in this case the support ring of the pre-forms can be present in this groove, so that an opposite face also acts as a holding down means for the plastics material pre-forms. In this case it is optionally possible to dispense with the central holding down means mentioned above.

In the case of the present invention it is advantageous for a forcible guidance of the plastics material pre-forms by compressed air to take place. Compressed air can flow in this case out of aeration slots which are acted upon with compressed air by means of blowers. The plastics material pre-form is blown at the aperture by the compressed air which flows out of the aeration slots. In this way, the drive for the plastics material pre-form is produced. A horizontal conveying path is possible in straight portions or in curved segments which reverse their direction.

As mentioned above, this described conveying of the plastics material pre-forms can be possible in this case by the pre-form air conveyor according to the invention from a pre-form sorter between various machines which process plastics material pre-forms, such as for example a sorter, a blow moulding machine, an inspector or the like.

In the case of a further advantageous embodiment the design of the air shaft is divided into two or the air shaft comprises two air shafts separated at least in part.

To this end, it is preferable for the compressed air supplied to be divided—in particular uniformly—into two separate air supply ducts and air shafts, which then provide the drive for the pre-forms by the associated aeration slots in each case. In this way, a first supply line can be provided which supplies the compressed air into the first shaft portion, and a second supply line which supplies the compressed air into the second shaft portion. It is preferable for these two shaft portions to be made symmetrical to each other, and in a particularly preferred manner mirror-symmetrical with respect to a conveying path of the plastics material pre-forms. Air shafts separated from one another are understood to be that although they can be connected to one other in terms of flow they are separated or capable of being separated from one another at least mechanically. It is preferable for one of the two air shafts or shaft portions to be movable with respect to the other shaft or shaft portion respectively. In this case it is advantageous for the shaft portion to be movable in its entirety. In addition, it is preferable for the separate air shafts to be formed by at least one air shaft which is displaceable (with respect to its geometrical position) and one stationary air shaft.

It is preferable for at least some of the lateral guides associated with the at least one displaceable air shaft and preferably for all the lateral guides in question to be jointly displaceable with the aforesaid air shaft. It is preferable for at least some guiding elements for guiding the plastics material pre-forms to be coupled to at least one shaft portion and preferably to exactly one shaft portion.

The described air conveyor of the plastics material pre-forms permits a reliable conveying of the plastics material pre-forms in an advantageous manner by a unilateral common displacement of an air shaft and also of the guide rails and—in a particularly preferred manner—also of the lateral guiding devices. In this case it is preferable for a common displacement device to be provided which has the effect that the distance between an aeration slot and the aperture of the plastics material pre-forms remains the same for each plastics material pre-form. In the case of a further advantageous embodiment the guide rail is designed in the form of an extruded component. In addition, as mentioned above, for adaptation to different plastics material pre-forms (in particular to different diameters of the pre-forms) in each case it is advantageous not for both the guide rails to be displaced but only one of the two guide rails.

It is advantageous for the air conveyor described above to be suitable both for pre-forms and for containers.

Further advantages and embodiments may be seen in the accompanying drawings. In the drawings

Figure 1:
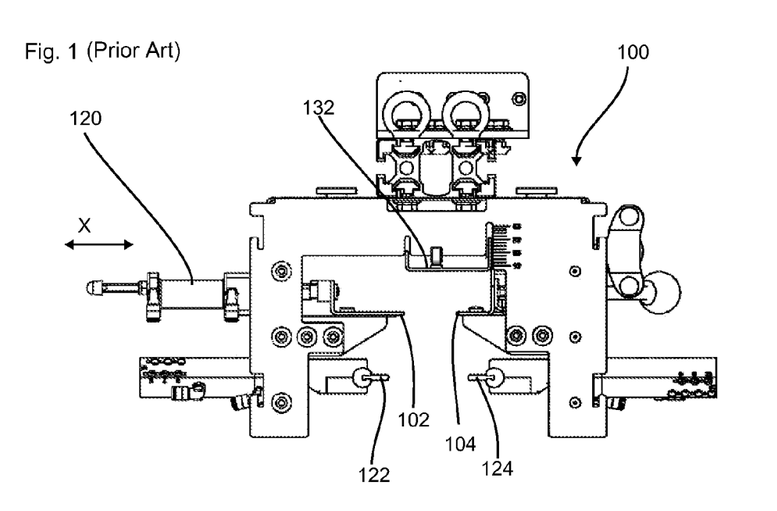
FIG. 1 shows an apparatus for the conveying of plastics material pre-forms according to the prior art.

FIG. 1 is a sectional illustration of an apparatus 100 for the conveying of plastics material pre-forms (not shown). In this case this apparatus has a first guide rail 102 and a second guide rail 104. These guide rails support the plastics material pre-form on its carrying ring and hold it in this way. The reference numbers 122 and 124 relate to lateral guiding devices and the reference number 132 relates to a holding-down means. A displacement element 120 serves for the unilateral displacement of the guide rails, i.e. for moving the guide rail 102 in the direction X. In this way, the plastics material pre-form is guided on its carrying ring between the two guide rails. The holding-down means 132 is used in order to prevent the plastics material pre-forms from rising up.

The lateral guiding devices 122 and 124 guide the shaft respectively stem of the plastics material pre-form, in which case railings (i.e. lateral guiding devices) displaceable symmetrically on both sides in each case are likewise provided here. A possible run-down angle for the guide rails 102 and 104 shown in FIG. 1 is 26°. In the case of this embodiment the guide rails 102 and 104 are displaced pneumatically, but a displacement by means of linear motor drives or hydraulic drives or the like would also be possible. In the case of the design shown, the carrying strips (or guide rails respectively) can be formed for example from high-grade steel. On account of this design, breakdowns of the flow of pre-forms can occur more frequently, in particular in the case of light pre-forms.

Figure 2:
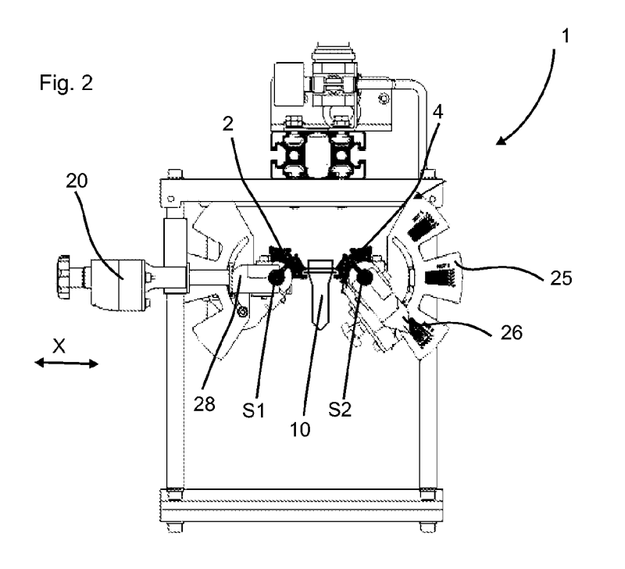
FIG. 2 shows a first embodiment of an apparatus according to the invention for the conveying of plastics material pre-forms.

FIG. 2 shows a first design of an apparatus 1 according to the invention. In the case of this design a first guide rail 2 is likewise provided as well as a second guide rail 4. It will be seen that the plastics material pre-form 10 is guided between these two guide rails. In addition, these two guide rails are in each case displaceable or pivotable respectively about pivot axes S1 and S2 (extending at a right angle to the plane of the figure). In this way, as will be explained in detail below, an adaptation to different pre-forms is possible. The conveying path P of the plastics material pre-forms likewise extends in this case at a right angle to the plane of the figure. The reference number 20 designates a displacement device by which the left-hand guide strip 2 can be displaced laterally in this case, i.e. in the direction of the double arrow X. The reference number 25 designates an angular scale by which it is possible to read off the pivoting setting (fine setting) at which the respective guide strips 2 and 4 are present in each case. The reference number 26 designates a display element or an angle indicator, by means of which the respective angle setting can be read off. In this case both a step-wise setting, as in three different settings here, and a fine setting for adjusting the precise angle setting are possible.

The two guide rails 2 and 4 are arranged in this case in a pivotable manner on a carrier 28, so that in the event of pivoting about the respective pivot axes S1 and S2 the guide rails are also jointly pivoted. The carrier 28 is in turn preferably arranged in a rotationally fixed manner. The pivoting of the two guide rails 2 and 4 can be carried out by hand, with a motor or pneumatically in this case.

Figure 3:
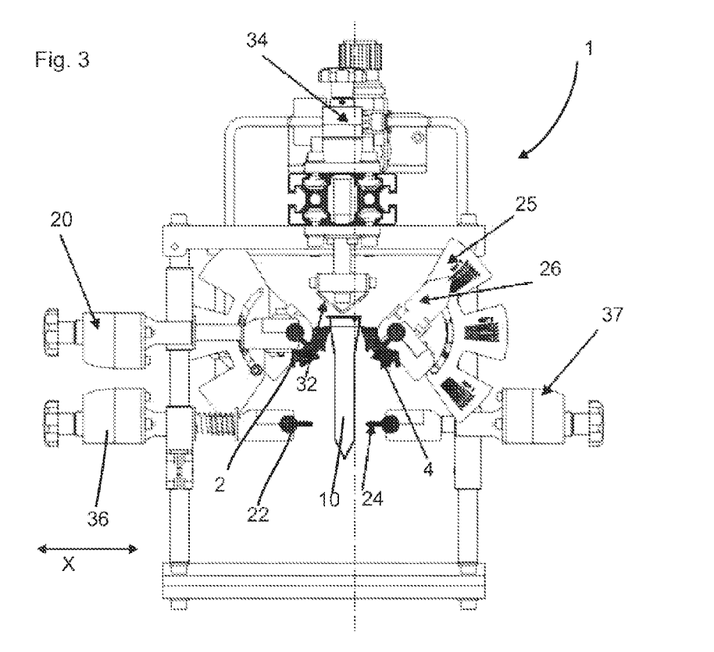
FIG. 3 shows a second embodiment of an apparatus for the conveying of plastics material pre-forms.

FIG. 3 shows a further embodiment in which the plastics material pre-form 10 to be conveyed is also illustrated here. As in FIG. 2, the two guide rails 2 and 4 as well as the displacement device 20 are also illustrated here. In addition, a holding-down means 32, which is arranged above the plastics material pre-forms 10 or the conveying path P thereof respectively, is also provided in FIG. 3. The reference number 34 relates to a displacement device which sets a vertical position of this holding-down means 32.

The reference numbers 22 and 24 relate to lateral guiding elements which guide the plastics material pre-form 10 on the main body thereof. In this case the reference number 36 relates to a further displacement device with which these lateral guiding devices or pre-form railings respectively can likewise be displaced in the direction of the double arrow X, i.e. to the left or the right. In this case both a separate setting of these two lateral guiding devices 22, 24 and a separate setting are possible. It will be seen that in the case of the embodiment shown in FIG. 3 an angle of the two guide rails 2, 4 is present which is different from the illustration given in FIG. 2.

Figure 4:
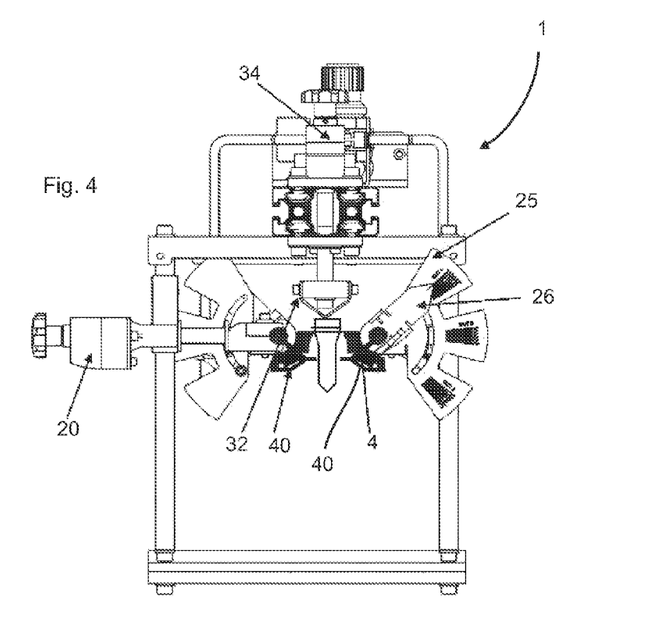
FIG. 4 shows a third embodiment of an apparatus for the conveying of plastics material pre-forms.

The embodiment shown in FIG. 4 essentially corresponds to the design shown in FIG. 3, in which case an adapter element 40 or an anti-wear profile respectively is additionally arranged in each case on the guide rails 2 and 4. This anti-wear profile can also be used in this case for adaptation to different geometries of the pre-forms.

Figure 5:
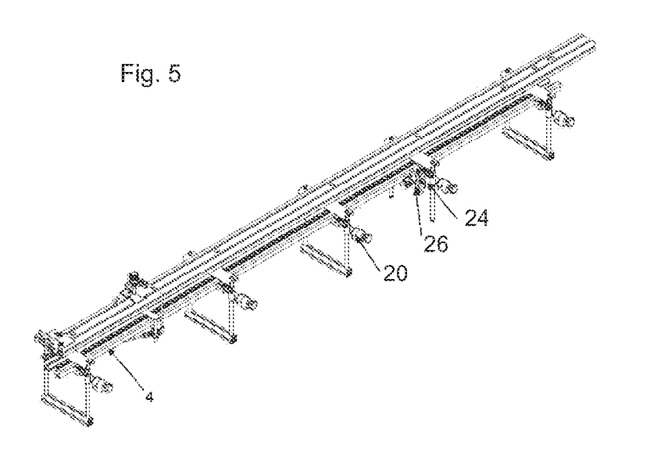
FIG. 5 is an overall view of an apparatus for the conveying of plastics material pre-forms.
Figure 6:
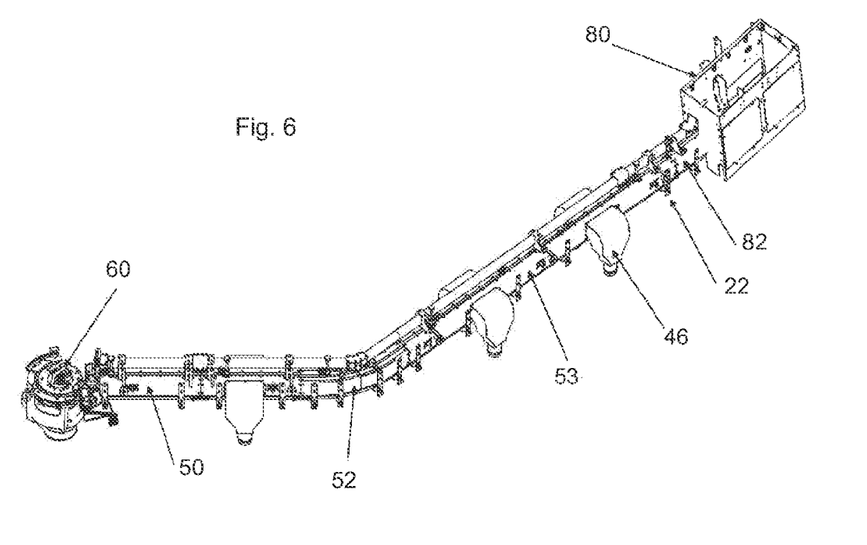
FIG. 6 is a further overall view of an apparatus for the conveying of plastics material pre-forms.

FIG. 5 gives an overall view of the apparatus according to the invention, in which case a displacement device for the guide rail interval 20 and also the elements 24 and 26 may be seen. FIG. 6 is a further illustration which, in particular, shows the integration of the conveying device in a plant. In this case the reference number 60 relates to a single-ended star wheel which can transfer the plastics material pre-forms in a clock-timed manner to a further apparatus, for example to a blow moulding machine, in particular a stretch blow moulding machine for the shaping of plastics material pre-forms into plastics material containers. In a corresponding manner, the reference number 50 designates an exit region of the conveying device according to the invention. It will be seen that the apparatus according to the invention is also suitable for conveying the plastics material pre-forms over a curved path. In a corresponding manner, the reference number 52 designates a curved portion of the conveying device. In a corresponding manner, the reference number 53 designates a straight portion of the conveying device.

The reference number 46 designates an air supply in order to supply or make available the air required for conveying the plastics material pre-forms. The reference number 80 designates in a roughly diagrammatic manner a roller-type sorter which is used for sorting the plastics material pre-forms and which can have for example two rollers which are arranged opposite each other and between which the plastics material pre-forms can be conveyed. The reference number 82 designates an entry for the conveying device according to the invention. In addition, a guide device 22 for guiding the main body of the plastics material pre-form may also again be seen.

Figure 7:
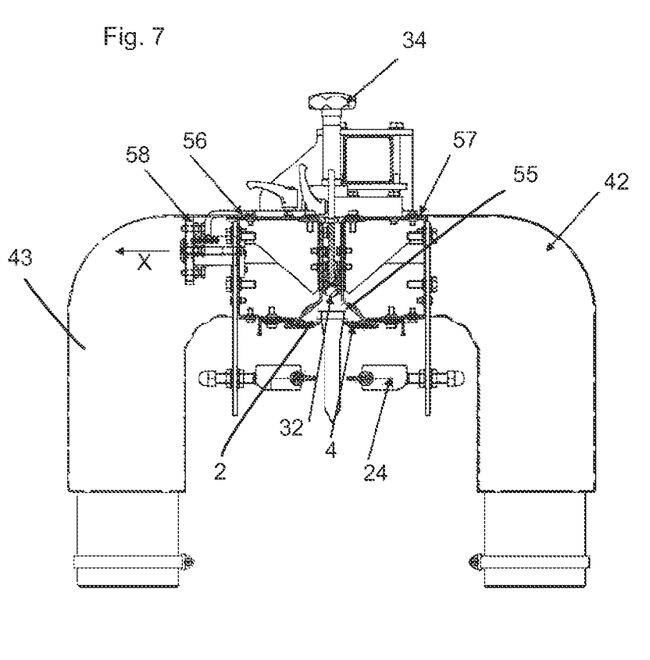
FIG. 7 is a view to show the air conveying.

FIG. 7 is a sectional illustration of an apparatus 1 according to the invention. In this case too, the air supply ducts 46 are again provided, which then open into the respective air supply ducts 42 and 43. The displaceable air shaft 56 and the stationary air shaft 57 are supplied by these air supply ducts with compressed air which is supplied in each case in order to convey the plastics material pre-forms 10. For the sake of better visualization, not all the elements which have been described above are illustrated here. The air in this case is blown into an air guide duct 55 by way of the two air supply ducts 42 and 43 and, in this way, it acts upon the apertures of the plastics material pre-forms with a force which drives the plastics material pre-forms forwards.

In this case too, the plastics material pre-forms are guided on the carrying ring thereof between the two displaceable guide rails 2, 4. In addition, the air shaft designated as a whole by the reference number 56 is adjustable in this case and, in particular, is displaceable in the direction of the double arrow X. The reference number 58 relates to an adjustment unit in order to displace the entire air shaft 56 including the guide rail 4 in the direction of the double arrow X. The reference number 57 designates a stationary air shaft.

Figures 8A, 8B:
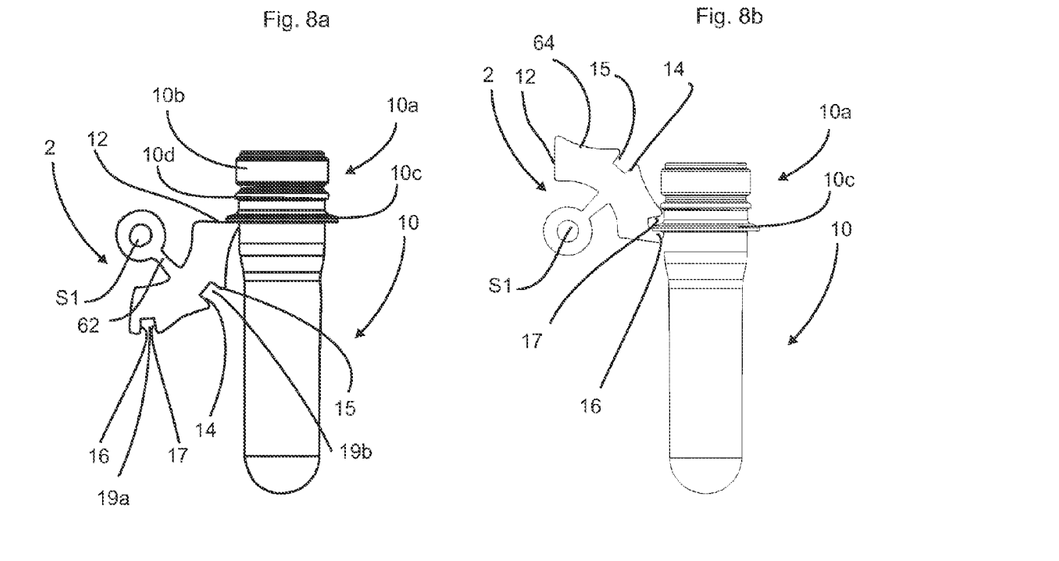
FIGS. 8a to 8c are three illustrations to show guide rails.
Figure 8C:
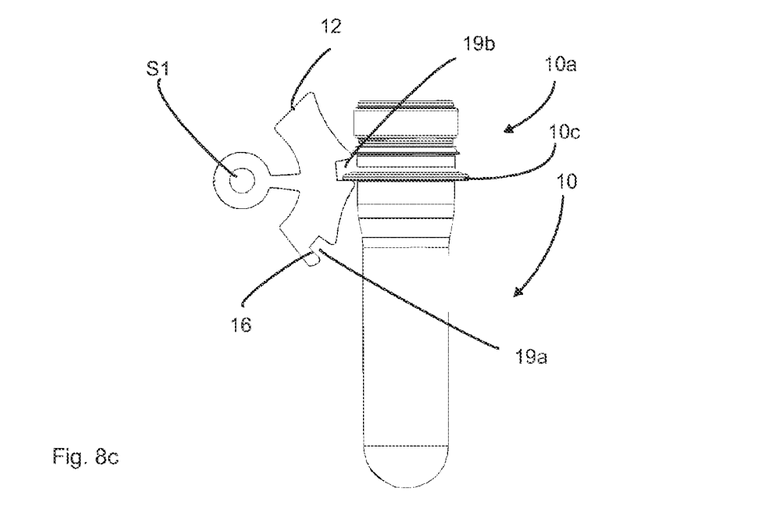

FIGS. 8a to 8c are three illustrations of a guide rail 2 according to the invention which, in particular, can be used with the apparatus described above. It will be seen that the guide rail designated 2 as a whole (the guide rail 4 is not shown here) has a plurality of support faces 12, 14, 16 which can be positioned substantially horizontally as a whole depending upon the pivoting position of the guide rail 2 and, in this way, can guide the plastics material pre-form below its carrying ring 10c. The reference 10d designates a retaining ring which is usually situated above the carrying ring, and the reference 10b designates a thread of the plastics material pre-form. The reference 10a designates the entire aperture region of the plastics material pre-form, and the reference 10e designates a main body which can be guided by the lateral guide rails mentioned above.

The reference numbers 17 and 15 relate in each case to upper boundary edges which together with the abutment faces 14 and 16 bound grooves 19 in each case, inside which the carrying rings are guided. These upper boundary edges can also act as holding-down elements there.

In the three illustrations 8a to 8c the guide rail 2 is shown in three different pivoting settings with respect to its pivot axis S1, and the plastics material pre-form 10 is accordingly guided by different support faces 12, 14 and 16 in each case. In this case it is advantageous for all the support faces 12, 14, 16 and grooves 19a, 19b to be arranged radially around the respective pivot axes S1 and S2.

Figure 9A:
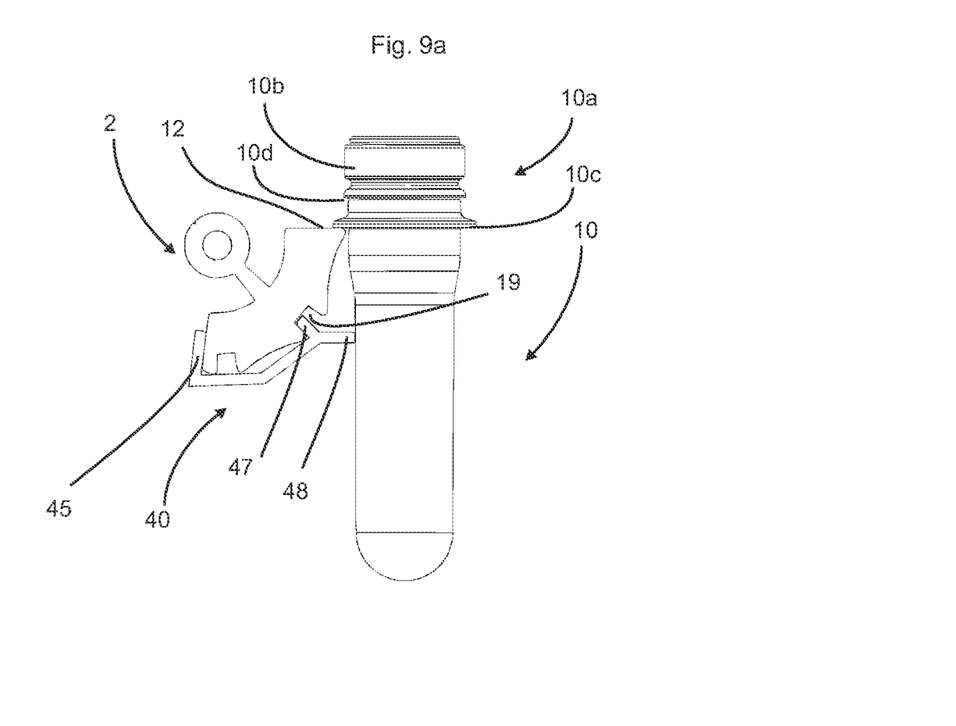
FIGS. 9a and 9b are two illustrations to show guide rails with adapter elements.
Figure 9B:
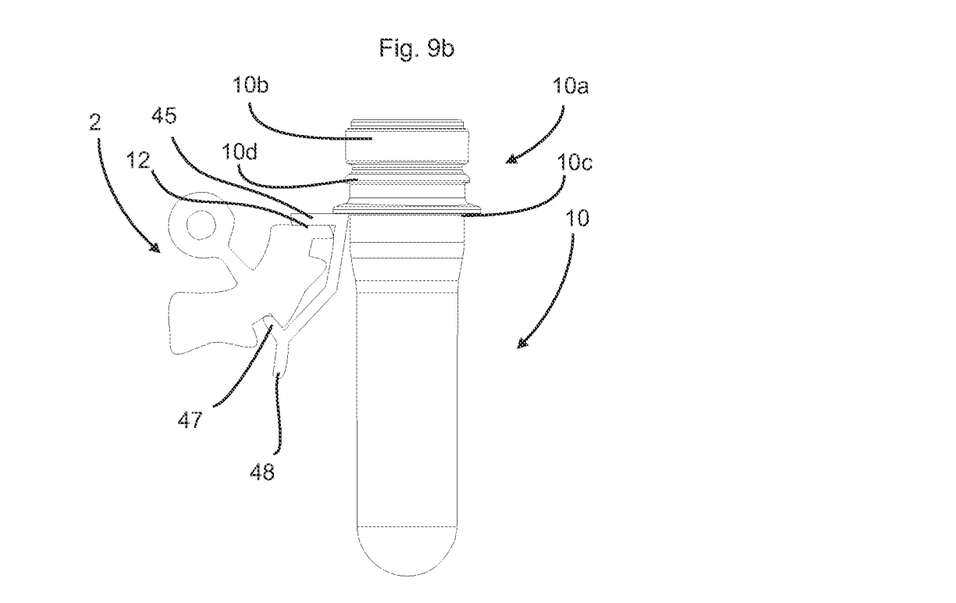

FIGS. 9a, 9b show a further embodiment of a guide rail according to the invention. In this case a removable adapter element (for example of plastics material) is arranged on the actual guide rail 2. In this case a first clamping means 45 which engages around part of the guide rail 2 is provided on one side in order to be clamped on the guide rail in this way. A second clamping means 47 engages in the groove 19 of the guide rail. A projection 48 can be used in this embodiment in order to act as a lateral guiding element for the plastics material pre-form 10.

In the case of the illustration shown in FIG. 9b a support face 45 (the clamping means is also used in this case as a support face) of the adapter element 46 is provided in order to be used itself as a guide rail for the plastics material pre-form or the carrying ring thereof. It is also advantageous in this case for all the support faces 12, 14 and 16 and grooves 19a, 19b, the first clamping means 45 (also as a support face) and the second clamping means 47 and the lateral guiding element 48 again to be arranged radially around the respective pivot axes S1 and S2. In this way, by using a plurality of different guide faces it is possible for the plant to be adapted to different types of plastics material pre-forms.

The Applicants reserve the right to claim all the features disclosed in the application documents as being essential to the invention, insofar as they are novel either individually or in combination as compared with the prior art.

TABLE 1

List of References

| | |
|---|---|
| 1 | apparatus |
| 2 | left-hand guide rail |
| 4 | right-hand guide rail |
| 10 | plastics material pre-form |
| 10a | aperture region |
| 10b | thread |
| 10c | carrying ring |
| 10d | retaining ring |
| 10e | main body |
| 12, 14, 16 | support faces |
| 15, 17 | boundary edges |
| 19a, b | grooves |
| 20 | displacement device |
| 22 | lateral guiding device |
| 24 | lateral guiding device |
| 25 | angular scale |
| 26 | angle indicator |
| 28 | carrier |
| 32 | holding down element |
| 34 | displacement device |
| 40 | adapter element |
| 42 | air supply duct |
| 43 | air supply duct |
| 45 | first clamping means (also forming a support face) |
| 46 | air supply |
| 47 | second clamping means |
| 48 | projection |
| 50 | exit region |
| 52 | curved portion of the conveying device |
| 53 | straight portion of the conveying device |
| 55 | air guide duct |
| 56 | air shaft (displaceable) |
| 57 | stationary air shaft |
| 58 | adjustment unit |
| 60 | single-ended star wheel |
| 80 | roller-type sorter |
| 82 | entry |
| 100 | apparatus (prior art) |
| 102 | first guide rail (prior art) |
| 104 | second guide rail (prior art) |
| 120 | displacement element (prior art) |
| 122 | lateral guiding device/lateral guiding element (prior art) |
| 124 | lateral guiding device/lateral guiding element (prior art) |
| 132 | holding-down means (prior art) |
| X | double arrow (lateral movement) |

TABLE 1-continued

List of References

| S1, S2 | pivot axes |
| P | conveying path of the plastics material pre-form |

The invention claimed is:

1. An apparatus (1) for the conveying of plastics material pre-forms (10) along a pre-set conveying path (P) with a first guide rail (2) for guiding the plastics material pre-forms (10), with a second guide rail (4) for guiding the plastics material pre-forms (10), wherein the plastics material pre-forms (10) are capable of being guided between the guide rails (2, 4) and the guide rails (2, 4) have in each case first support faces (12, 14) which extend along the conveying path (P) and which support the plastics material pre-forms (10) during the conveying thereof, wherein the apparatus (1) has a stressing device (42, 44) for acting upon the plastics material pre-forms (10) with a gaseous medium, which stressing device (42, 44) is designed in such a way that the plastics material pre-forms are conveyed along their conveying path by being acted upon with the gaseous medium, and wherein a geometrical position of the guide rails is capable of being altered with respect to each other and wherein at least one guide rail has a second support face (14,16) which extends along the conveying path (P) of the plastics material pre-forms (10), in such a way that the plastics material pre-forms (10) are capable of being optionally supported by means of the first support face (12) or the second support face (14, 16) during their conveying.

2. An apparatus (1) according to claim 1, wherein at least one guide rail (2, 4) for changing the geometrical position is pivotable about a pivot axis (S1, S2) which extends parallel to the conveying path of the plastics material pre-forms (10).

3. An apparatus (1) according to claim 1, wherein the apparatus has lateral guiding elements (22, 24) for the lateral guidance of the plastics material pre-forms (10).

4. An apparatus (1) according to claim 1, wherein the stressing device has a first air guide duct (46) which is arranged above the guide rails and which acts upon the apertures of the plastics material pre-forms with the gaseous medium for the conveying thereof.

5. An apparatus (1) according to claim 1, wherein the apparatus (1) has a holding down element (32) which is preferably arranged above the guide rails (2, 4).

6. An apparatus (1) according to claim 5, wherein a position of the holding down element (32) with respect to the guide rails (2, 4) is capable of being altered in a longitudinal direction of the plastics material containers (10).

7. A guide rail (2, 4) for the conveying of plastics material pre-forms (10), wherein the guide rail (2, 4) extends along a pre-set longitudinal direction and wherein the guide rail has a first support face (12) which likewise extends along the pre-set longitudinal direction and by means of which the plastics material pre-form (10) is capable of being supported during the conveying thereof, wherein the guide rail (2, 4) has a second support face (14, 16) which extends along the pre-set longitudinal direction and by means of which the plastics material pre-form (10) is capable of being supported during the conveying thereof, and wherein the two support faces (12, 14, 16) are formed on the guide rail (2, 4) in such a way that the plastics material pre-form is capable of being optionally supported by the first support face (12) or the second support face (14, 16) during its conveying.

8. A guide rail (2, 4) according to claim 7, wherein the guide rail has an adapter element (40) capable of being removed from the guide rail (2, 4), wherein this adapter element (40) extends in a state arranged on the guide rail (2, 4) along the pre-set longitudinal direction and forms a third support face (45), by means of which the plastics material pre-form is capable of being supported.

9. A guide rail (2, 4) according to claim 7, wherein at least one support face (14, 16) is a face bounding a guide groove (19a, 19b) for guiding the plastics material pre-forms (10).

10. An apparatus (1) for the conveying of plastics material pre-forms (10) along a pre-set conveying path (P) with a first guide rail (2) for guiding the plastics material pre-forms (10), with a second guide rail (4) for guiding the plastics material pre-forms (10), wherein the plastics material pre-forms (10) are capable of being guided between the guide rails (2, 4) and the guide rails (2, 4) have in each case first support faces (12, 14) which extend along the conveying path (P) and which support the plastics material pre-forms (10) during the conveying thereof, wherein the apparatus (1) has a stressing device (42, 44) for acting upon the plastics material pre-forms (10) with a gaseous medium, which stressing device (42, 44) is designed in such a way that the plastics material pre-forms are conveyed along their conveying path by being acted upon with the gaseous medium, and wherein a geometrical position of the guide rails is capable of being altered with respect to each other, wherein an air shaft of the apparatus has two separate air shafts (56, 57) and wherein the separate air shafts are formed by at least one displaceable air shaft (56) and one stationary air shaft (57).

11. An apparatus (1) according to claim 10, wherein all the respective lateral guides (2, 22) are jointly displaceable with the at least one displaceable air shaft (56).

* * * * *